United States Patent

Brunton

[15] 3,693,025
[45] Sept. 19, 1972

[54] APPARATUS AND METHOD FOR ELIMINATING INTERFERENCE ERRORS IN DUAL-BEAM INFRARED REFLECTION MEASUREMENTS ON A DIFFUSELY REFLECTING SURFACE BY GEOMETRICAL ELIMINATION OF INTERFERENCE-PRODUCING SPECULARLY-REFLECTED RADIATION COMPONENTS

[72] Inventor: Donald C. Brunton, Columbus, Ohio
[73] Assignee: Brun Sensor Systems, Inc., Columbus, Ohio
[22] Filed: Nov. 28, 1969
[21] Appl. No.: 880,543

[52] U.S. Cl..........250/83.3 H, 250/83.3 D, 250/219, 356/161
[51] Int. Cl.............................................G01n 21/32
[58] Field of Search.......250/83 IR, 83.3 D, 219, 222 TH; 356/161, 209, 210, 211, 212

[56] References Cited

UNITED STATES PATENTS 3,017,512  1/1962  Wolbert...............250/83.3 IR
3,322,962  5/1967  Muller......................356/161

Primary Examiner—James W. Lawrence
Assistant Examiner—Morton J. Frome
Attorney—Cennamo, Kremblas & Foster

[57] ABSTRACT

Interference error elimination is provided for infrared reflection measurement of a film having a diffusely reflecting surface by apparatus and method which utilizes geometrical arrangement of apparatus components for geometrical selection of only diffusely reflected radiation components and elimination of specularly reflected radiation components that would produce interference error. A specific application of this measurement technique is in connection with a two-layer, sheet-form product having a film of infrared-radiation-transmissive material formed on a substrate or base layer with the interface surface being diffuse. A radiation source forms and directs two beams of infrared radiation of discrete wavelengths in angularly incident relationship toward an exposed, specular surface of the film producing reflective-components at both the specular surface and the diffuse interface surface. Only diffusely reflected components of incident beams of radiation are detected by a radiation-responsive sensor which is disposed in a particular geometrical arrangement such that only the diffusely reflected beam components are incident to a radiation receptor surface of the sensor. Thus, interference errors are eliminated as the specularly reflected beam components will not be incident to the radiation sensors receptor-surface.

10 Claims, 1 Drawing Figure

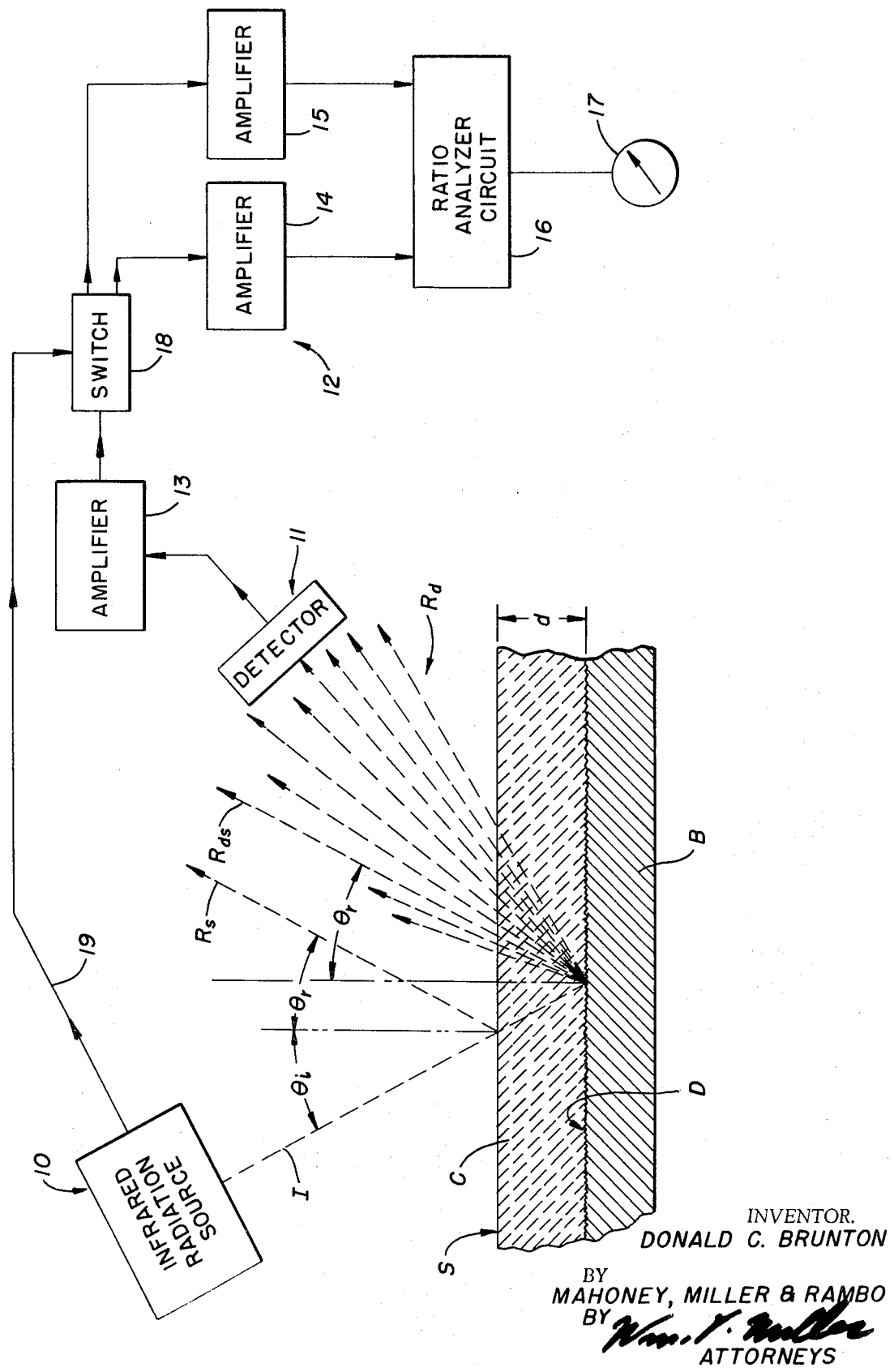

APPARATUS AND METHOD FOR ELIMINATING INTERFERENCE ERRORS IN DUAL-BEAM INFRARED REFLECTION MEASUREMENTS ON A DIFFUSELY REFLECTING SURFACE BY GEOMETRICAL ELIMINATION OF INTERFERENCE-PRODUCING SPECULARLY-REFLECTED RADIATION COMPONENTS

BACKGROUND OF THE INVENTION

Infrared measurements in accordance with known prior art techniques on a film having a specular first surface and a diffuse second surface are affected by interference errors as a consequence of the relative geometrical arrangements of the radiation source and the radiation-responsive sensor. The prior art techniques as exemplified in U.S. Pat. No. 3,017,512, issued Jan. 16, 1962 to Wolbert, relate to reflective measurements on a specular surface; however, basic radiation-beam-formation apparatus and apparatus for the subsequent detection of reflected beam components is illustrated and described and the technique of this invention is applicable to such apparatus for eliminating interference error. In a typical prior art specular reflection arrangement, the radiation sensor or detector is positioned in geometrical relationship to the radiation source so that specularly reflected radiation will be incident to a radiation receptor surface of the sensor as these components are of much greater magnitude than any diffusely reflected components that may be present. Such an arrangement results in an interference error in the measurement because there will be a relative phase displacement between radiation components specularly reflected from the first and second surfaces. This interference error is also present in a measurement of a film having a diffuse second surface where the sensor is positioned to primarily detect specularly reflected radiation components in accordance with prior art apparatus and techniques.

BRIEF DESCRIPTION OF THE INVENTION

The measurement technique of this invention is effective in eliminating interference error in connection with measurements of a relatively thin film of material, as in the case of a two-layer, sheet-form product having a film formed as a coating on a substrate, wherein infrared radiation incident to the film will have components reflected at both surfaces and, in some instances, will have components reflected from the substrate. This measurement technique is specifically applicable where the radiation is initially incident to a first, specular surface of the film, and the opposite or second surface is diffusely reflecting or the substrate is at least partially transmissive of infrared radiation although dispersive. A portion of the incident radiation will be specularly reflected from each of the surfaces at a specific angle while other portions or components of radiation will be diffusely reflected from the second surface or from the substrate at a number of angles and not coincident or parallel to the specularly reflected components. In the following description of this invention and the appended claims, the term diffusely reflected is intended to include radiation components diffusely reflected at the second surface of the film or diffusely reflected from the substrate, or both. Typical materials for the substrate include foils that may be opaque to infrared radiation or paper which may be dispersive of the radiation and thus effectively produce diffusely reflected radiation components from the radiation thus scattered. An organic material such as polyethylene often forms the film in the commercially available products and when such a material is formed as a coating on a diffuse surfaced substrate, the resultant film will have an exposed or outer surface (referred to as the first surface hereinafter in this specification) which is specular and an opposite or interface surface (referred to as the second surface hereinafter in this specification) which is diffuse. In the case of a substrate formed from a dispersive material, the substrate interface surface may also diffusely reflect incident radiation in addition to diffuse reflection of radiation from the substrate body. A radiation source capable of generating first and second beams of radiation of different wavelengths in the infrared spectrum, one of which is selected to exhibit resonance absorption or at least more absorption with respect to the material of the film, is positioned relative to the film to direct the beams toward the film in angularly incident relationship to the first surface of the film resulting in a portion of each beam being reflected at the first surface and a portion being transmitted through the film and reflected at the second surface or scattered from the material below the second surface. Second surface reflected components or substrate scattered components exit the film at the first surface, but will have been diffusely reflected or scattered and a substantial amount will not be aligned parallel to the first-surface specularly reflected components. A radiation-response sensor or radiation detector is disposed in angularly oriented relationship to the radiation source such that specularly reflected radiation will not be incident to a radiation-receptor surface of the sensor. Consequently, the sensor will only detect those radiation components diffusely reflected or scattered and the measurement will not be affected by interference error. An electronic signal analysis circuit with appropriate readout is connected with the sensor to provide an indication of a parameter of the film or a control signal in the case of an automated process control system.

These and other objects and advantages of the technique of this invention for eliminating interference error in measurement of a film having a diffusely reflecting surface will be readily apparent from the following detailed description of an embodiment thereof and the accompanying drawing in which the sole FIGURE is a diagrammatic representation of a dual-beam infrared measurement apparatus illustrating detection of only diffusely reflected radiation to eliminate error-introducing interference of first surface specularly reflected radiation.

DETAILED DESCRIPTION OF THE INVENTION

Having specific reference to the drawing, a measurement apparatus of the dual-beam, infrared radiation reflection type utilizing the interference elimination technique of this invention is diagrammatically illustrated with respect to a double-layer sheet-form material comprising a base sheet or substrate B having a film or coating C applied to a surface of the substrate. In this illustrative example, it is assumed that the substrate B and the coating C are a portion of an elongated sheet-form web shown in vertical section and which has been formed by a process wherein the film or a material forming the film was applied to a surface of the substrate and is bonded thereto forming a unitary structure. It is the objective of the apparatus and method of this inventive technique to determine a parameter of the film C which, for example, may be the film thickness $d$. The ultimate objective of determination of a particular film parameter, such as the thickness, is to provide means of effecting control over a continuous process, as, for example, control over the thickness $d$ of the film C as it is applied to the substrate C. In the material to which the measurement technique of this invention is applicable, the substrate B is formed from a material such as paper or a foil which may be opaque to infrared radiation and has a diffuse surface D at the interface with the film C producing diffuse reflection of radiation or which, in the case of a radiation-scattering substrate, may also produce back-scattering or simulated diffuse reflection in the substrate. The film C is formed from a material transmissive of the infrared radiation, an organic polyethylene material, for example, and has a specular outer surface S.

Apparatus for generating the two beams of infrared radiation and subsequently detecting the reflected components of each beam is only diagrammatically illustrated in the drawing as the several components comprise structures well-known in the art and includes a dual-beam, infrared radiation source designated generally by the numeral 10, a radiation responsive sensor 11 and a signal amplification and analysis circuit 12. The radiation source 10 is illustrated as being of the type which is capable of generating two discrete beams of infrared radiation having the respective wavelengths $\lambda_1$ and $\lambda_2$, and directing the two beams in angularly incident relationship toward the specular surface S of the film C for reflection at both the specular surface and the diffuse surface D or scattering from dispersive type substrate material. In this example, the two beams of radiation are illustrated as being directed along the same path and the radiation source is of the type that generates the two beams in time-spaced relationship for transmission to the film in an alternating fashion. The illustrated beam-path is applicable to both beams for the purpose of illustrating the technique of this invention for eliminating interference error effects of the optical interference phenomenon. U. S. Pat. No. 3,089,382 is illustrative of the type of dual-beam radiation generating apparatus which may be utilized for producing the two-time-spaced beams of radiation for the reflective-type measurement technique such as is basically disclosed in the previously cited U.S. Pat. No. 3,017,512. In this type apparatus, an infrared radiation source producing polychromatic radiation is arranged to direct the emitted radiation toward the subject under test and the radiation is caused to pass through filter elements which are alternatingly interposed in the path of the radiation to form the two beams of radiation of different wavelengths. These filter elements, which are of the band-pass-type having a designed pass-band of a desired wavelength spectrum, are mechanically supported in the path of the radiation by means such as a revolving wheel to alternatingly pass through the path of the radiation and produce two time-separated beams of monochromatic radiation. The wavelength of the designed pass-band for each filter element is determined by the specific film material and the property or parameter of interest in a particular test arrangement to provide one beam of radiation, the reference beam, of a wavelength $\lambda_1$ that, preferably is not absorbed by the material while the other beam of radiation, the absorption beam, is of a wavelength $\lambda_2$ selected to exhibit a characteristic resonance absorption. It is not necessary that the reference beam be totally unabsorbed by the film but only that its absorption be significantly less than that of the absorption beam. Accordingly, the two beams of radiation are transmitted unequally through the film due to absorption of one beam and this difference is detectable by an appropriate detection system to provide an output.

The radiation responsive sensor 11 is disposed in predetermined angular relationship to the source 10 so that only diffusely reflected radiation components will be incident to a radiation-receptor-surface of the sensor. Specific characteristics of the sensor 11 are determined by the particular radiation wavelengths utilized in a specific test arrangement and the sensor may be of the type known as a photovoltaic cell or it may be a photoresistive device. Either type of sensor includes terminals providing means of connection to an electronic amplifier circuit and the characteristics of the detector or sensor are utilized to form a signal at the output of the amplifier. This amplified output signal is subsequently fed to respective amplifier circuits 14 and 15 that respond to signal components related to the two specific radiation beams. An output signal from each amplifier circuit 14 and 15 is then fed into a ratio-analyzer-circuit 16 and the output of the ratio circuit subsequently drives a readout device 17 such as an indicating meter. Alternatively, although not shown, the output signal from the ratio-analyzer-circuit 16 may be utilized to drive a process control circuit. Control over alternate routing of the signal from the amplifier 13 to the respective amplifier circuits 14 and 15 is controlled by an electronic switching circuit 18 which functions in times relationship to the operation of the source 10 in generating the two discrete beams of radiation. For example, the mechanisms controlling operation of the filtering mechanism can be utilized to provide a signal to synchronously operate the switching circuit 18. A circuit connection for this switching signal is indicated graphically at 19. In view of the previous detailed disclosures of radiation generation and detection apparatus as in U.S. Pat. No. 3,089,382, it is believed that the foregoing brief description of apparatus components will be adequate for a complete understanding of the interference eliminating technique of this invention.

Both beams of radiation travel along the same path and are incident to the specular, first surface S of the film C and a portion of the radiation will be specularly reflected. The path of incidence is designated by the letter I in the drawing and the path taken by that portion of the radiation specularly reflected at the first surface S is designated by the letter $R_s$. Angles of incidence $\theta_i$ and reflection $\theta_r$ with respect to a normal to the surface S at the point of incidence are also designated in the drawing. Not all radiation incident to the specular surface S will be reflected at that surface and portions of each beam of radiation enter the film C and are incident to the diffuse second surface D. While the film C normally comprises a material having an index of refraction different from that of the intervening space between the source 10 and the film, the effects of any resultant refraction have not been illustrated in the the drawing and are not discussed in the specification as both beams are affected to substantially the same extent and the effect is self-cancelling since each beam exits the film into the same space. Those portions of each beam incident to the second surface D will be diffusely reflected resulting in a multiplicity of radiation components indicated generally at $R_d$ directed toward the surface S in relatively divergent relationship. The diffusely reflected radiation may include a component $R_{ds}$ which is aligned with an assumed path of reflection that is at angle of reflection equal to the angle of incidence and thus parallel to the path of the specularly reflected radiation $R_s$; however, a substantial amount of the diffusely reflected radiation will be directed along paths oriented at angles other than that of the specular reflection and angle $\theta_r$. A relatively large proportion of the diffusely reflected radiation will be directed along paths which are oriented at angles greater than the specular reflection angle $\theta_r$. Several paths for diffusely reflected radiation are shown in the drawing for the purpose of illustrating the effect but are not intended to be indicative of an actual pattern of reflected radiation or the magnitude of the reflected radiation component at any specific angle.

In accordance with this invention, as previously indicated, the radiation-responsive sensor 11 is geometrically oriented relative to the reflected radiation to prevent incidence of specularly reflected radiation $R_s$ at the radiation receptor surface of the sensor. This technique limits the detected radiation to only those radiation components which are diffusely reflected at the second surface D and, as shown in the drawing, the sensor is positioned to further limit detection of diffusely reflected components to those that are reflected at an angle which is greater than the angle of reflection $\theta_r$ for specularly reflected radiation. Detection of only the diffusely reflected components of each beam prevents introduction of measurement errors due to interference between beam components that are relatively phase displaced as are the first surface specularly reflected components and the diffusely reflected components. This is accomplished by positioning the radiation-responsive sensor 11 in angularly spaced relationship to the radiation source 10 such that the receptor surface of the sensor will not extend into the space through which the specularly reflected components $R_s$ pass. The specific angular relationship in any particular test arrangement is determined by the physical size of the sensor's receptor surface and the diffuse reflection pattern to obtain a maximum response. It will be noted that the drawing does not accurately illustrate the proportional geometric relationship of the several radiation components as the specularly reflected components $R_s$ and $R_{ds}$ which are spaced parallel at a distance determined by the thickness of the film C and would be relatively close together in most test applications since the usual films are relatively thin. In view of this practical aspect of measurement of these films, the detector 11 would be positioned so that no diffusely reflected components at a reflection angle less than $\theta_r$ would be incident to the detector. While the drawing is only two-dimensional, it will be recognized that the diffusely reflected radiation will have a third dimension but this does not affect illustration of the technique of positioning the sensor 11 to only be responsive to diffusely reflected radiation.

The techniques of this invention are specifically applicable to measurement of a parameter of a film C formed from an organic material such as polyethylene. Measurement results of a polyethylene film parameter are affected by the specific wavelengths $\lambda_1$ and $\lambda_2$ selected for the respective reference and absorption beams and it has been found that the thickness of the film C also is a factor in determining the wavelengths for optimum results. For thick polyethylene films which exceed 0.0,005 inches in thickness, up to about 0.010 inch, the preferred absorption wavelength is selected to be within the 2.30 – 2.60 micron wavelength spectrum and the reference wavelength which does not exhibit absorption is preferably selected to be relatively close to the absorption wavelength and, in this instance, is 2.25 ± 0.02 microns. For relatively thin polyethylene films, those films having a thickness dimension less than 0.001 inch, the optimum wavelength of radiation exhibiting absorption is 3.45 ± 0.02 micron and the reference wavelength which is preferably selected to be close is either 2.65 ± or 3.75 ± 0.02 micron.

The foregoing detailed description is specifically directed to the illustrative example shown in the drawing; however, as previously stated, this measurement technique is also applicable to the case where the substrate is transmissive of the infrared radiation to a degree but is dispersive. In connection with measurements of film formed on a dispersive substrate, it will be readily seen that there would be radiation components diffusely scattered or reflected at numerous levels or depths within the substrate in a manner similar to the illustrated diffuse reflection at the interface surface. Positioning of the radiation sensor as previously described will also result in detection of only those scattered radiation components that exit the film at the first or specular surface at angles other than the specularly reflected components and interference errors effects will be avoided in the same manner. It is necessary in the case of scattered radiation to eliminate any error arising from absorption of either or both the reference and absorption beams by the substrate material. This can be accomplished best by selecting wavelengths for each beam which do not exhibit absorption in the substrate material. If selection on this basis is not possible, then selection of wavelengths for each beam to exhibit equal absorption in the substrate or to select wavelengths such that the ratio of absorption for each beam is substantially different for the film and the substrate.

This measurement technique for eliminating interference caused errors in infrared measurement is particularly advantageous with respect to films or coatings where the second reflective surface is diffuse or where the substrate comprises a dispersive material producing diffuse scattering (effectively diffuse reflection for the purposes of this measurement technique) and is a relatively ineffective technique when applied to films having a relatively smooth or specular second surface. Performing reflective measurements to utilize only diffusely reflected or diffusely back-scattered components avoids error introduced by interference from a relatively phase displaced beam of radiation or components of such a beam. Positioning of the radiation sensor in angularly spaced relationship to the incident beams of radiation to prevent specularly reflected radiation from being incident to the radiation-receptor surface of the sensor accomplishes the objective of eliminating interference errors. Selection of appropriate wavelengths for the absorption and reference beams further enchances the accuracy of the reflection measurement with respect to a polyethylene material.

Having thus described this invention, what is claimed is:

1. A dual-beam infrared reflection measurement method for determining a parameter of a radiation-transmissive film where radiation incident to the film is both specularly and diffusely reflected comprising the steps of
    A. generating first and second beams of infrared radiation of respectively different wavelengths, one of which is selected to exhibit substantially more absorption with respect to the film material than the other, and directing said beams toward the film in angularly incident relationship to a first specular surface thereof with components of each beam specularly reflected from the first surface at a single predetermined angle and with other components of each beam entering the film to be diffusely reflected and subsequently exit the film at a number of angles including said predetermined angle,
    B. sensing and detecting by a radiation responsive sensor only those components of each beam diffusely reflected at angles greater than said predetermined angle and forming a signal related to the magnitude of each respective beam of radiation thus detected, and
    C. determining the ratio of the signals for each beam thereby providing an indication of the film parameter.

2. The method of claim 1 for measurement of a polyethylene film having a thickness greater than 0.0,005 inch and utilizing radiation of wavelengths in the range of 2.30 − 2.60 microns for one of the beams to exhibit absorption with respect to polyethylene material and utilizing a relatively close wavelength for the other beam which does not exhibit absorption.

3. The method of claim 2 wherein the other beam wavelength is 2.25 ± 0.02.

4. The method of claim 1 for measurement of polyethylene film having a thickness less than 0.001 inch and utilizing radiation of 3.45 ± 0.02 micron wavelength for one of the beams to exhibit absorption with respect to polyethylene material and utilizing a relatively close wavelength for the other beam which does not exhibit absorption.

5. The method of claim 4 wherein the beam wavelength is either 2.65 ± 0.02 or 3.75 ± 0.02 micron.

6. Apparatus for effecting dual-beam, infrared reflection measurement of a parameter of a radiation-transmissive film where radiation incident to the film is both specularly and diffusely reflected comprising
    A. a radiation source generating first and second beams of infrared radiation of respective, different wavelengths, one of which is selected to exhibit substantially more absorption with respect to the film material than the other,
    B. means directing said beams of radiation toward the film in angularly incident relationship to a first specular surface thereof with components of each beam specularly reflected from the first surface at a single predetermined angle and with other components of each beam entering the film to be diffusely reflected and subsequently exit the film at a number of angles including said predetermined angle,
    C. a radiation responsive sensor interposed in the path of reflected components of the beam and angularly oriented to detect only those components diffusely reflected at angles greater than said predetermined angle of specularly reflected radiation, said sensor forming a respective signal related to the magnitude thereof for each beam thus detected, and
    D. means responsive to the respective beam signals thus formed for each beam and forming an output signal which is a ratio of the beam signals and indicative of a parameter of the film.

7. Apparatus according to claim 6 wherein the wavelength of the first radiation beam exhibits absorption with respect to polyethylene material and is selected to be within the range of 2.30 − 2.60 micron and the wavelength of the second radiation beam is selected to be relatively close.

8. Apparatus according to claim 7 wherein the wavelength of the second radiation beam is selected to be 2.25 ± 0.02 microns.

9. Apparatus according to claim 6 wherein the wavelength of the first radiation beam is selected to exhibit absorption with respect to polyethylene material and is 3.45 ± 0.02 micron and the wavelength of the second radiation beam is selected to be relatively close.

10. Apparatus according to claim 9 wherein the wavelength of the second radiation beam is selected to be 2.65 ± 0.02 or 3.75 ± 0.02 microns.

* * * * *